July 9, 1935.  R. D. CRAWFORD  2,007,296
BAIT FISH RECEPTACLE
Filed Dec. 8, 1933  4 Sheets-Sheet 1

Inventor:
Ralph D. Crawford.
by
his Attorney

July 9, 1935.  R. D. CRAWFORD  2,007,296
BAIT FISH RECEPTACLE
Filed Dec. 8, 1933    4 Sheets-Sheet 2
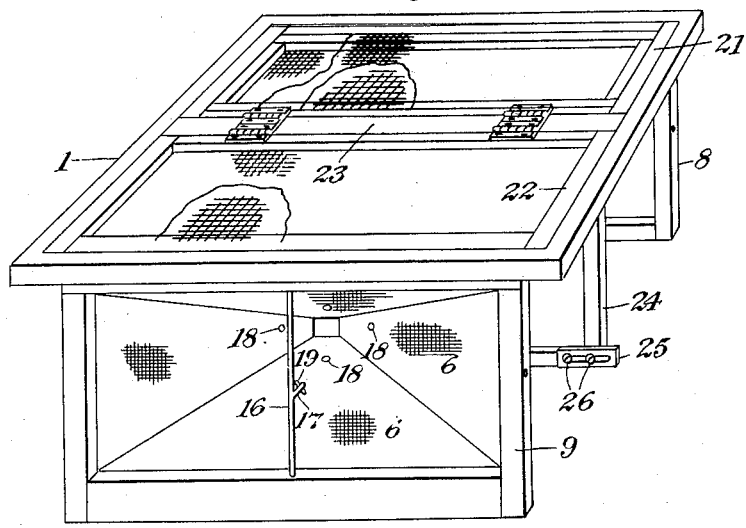
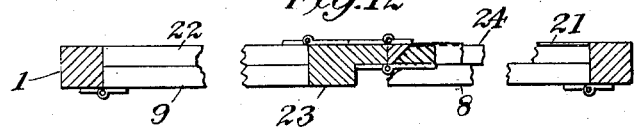
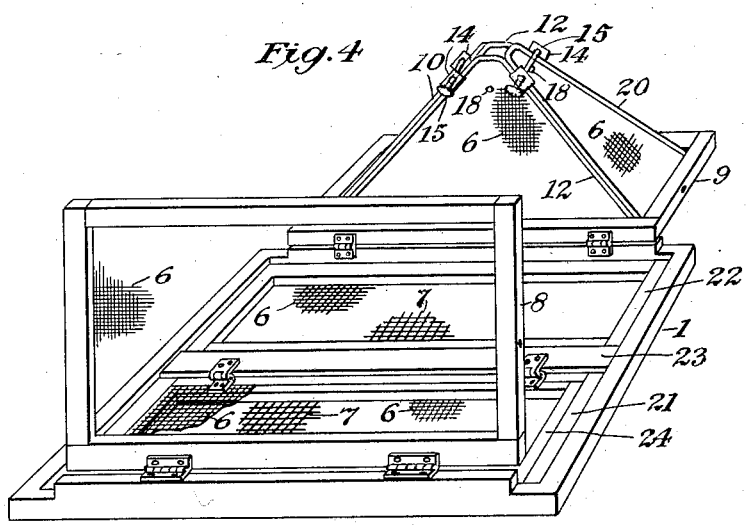

July 9, 1935. R. D. CRAWFORD 2,007,296
BAIT FISH RECEPTACLE
Filed Dec. 8, 1933 4 Sheets-Sheet 3
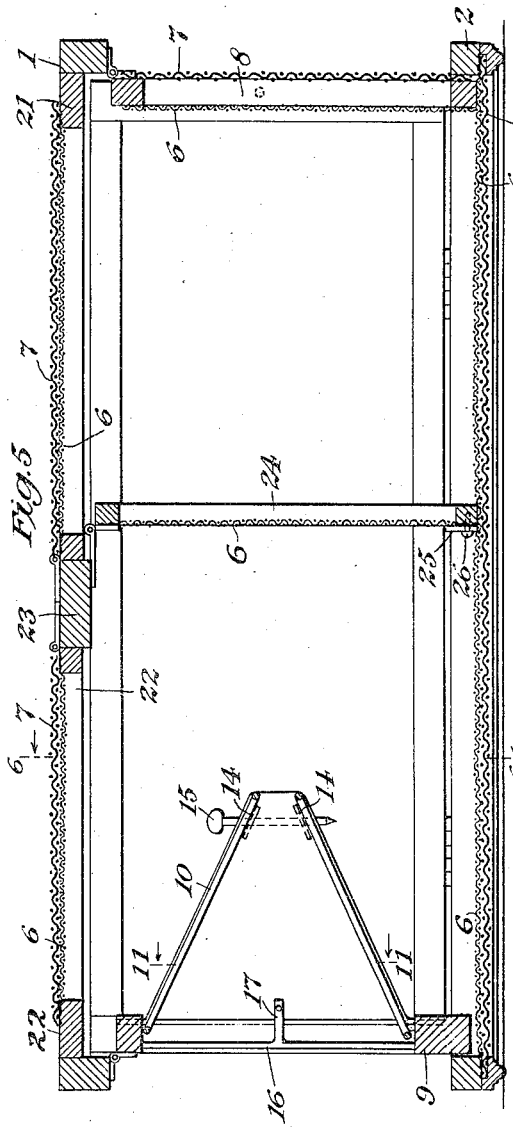
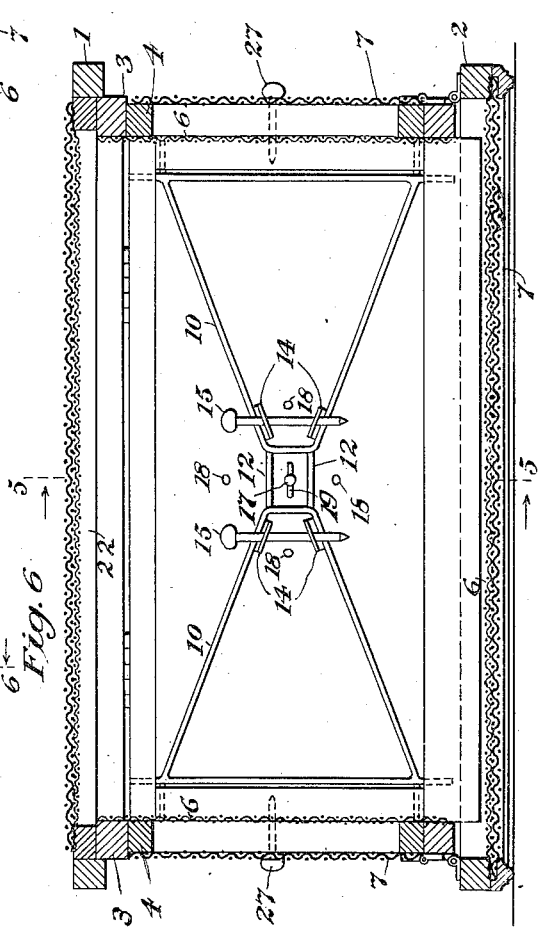
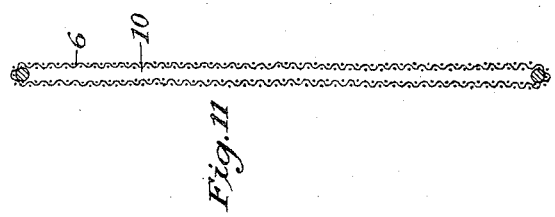
Inventor:
Ralph D. Crawford
by
Andrew Nidau
his Attorney July 9, 1935.  R. D. CRAWFORD  2,007,296
BAIT FISH RECEPTACLE
Filed Dec. 8, 1933  4 Sheets-Sheet 4
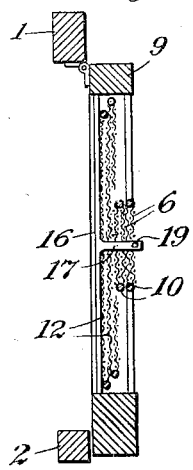
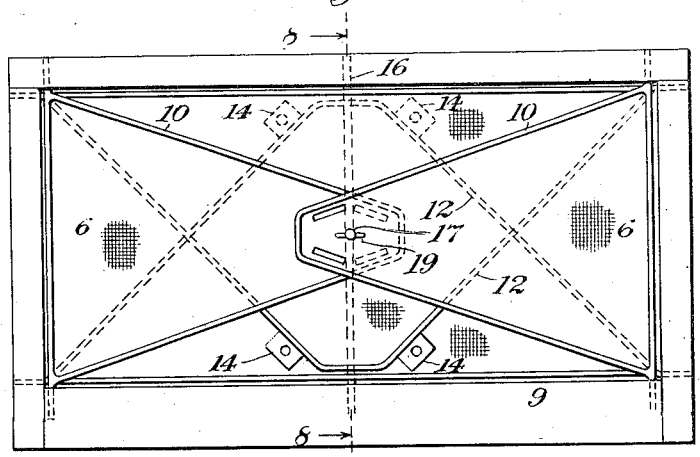
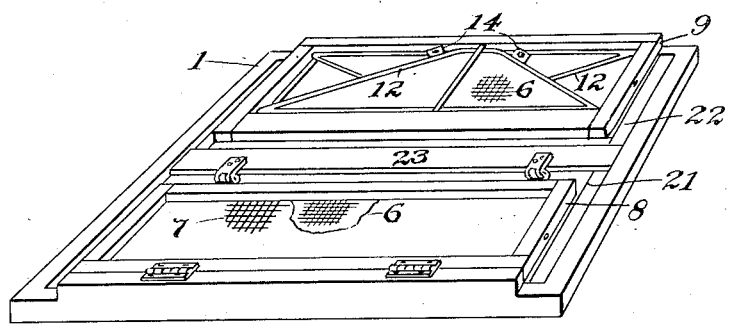
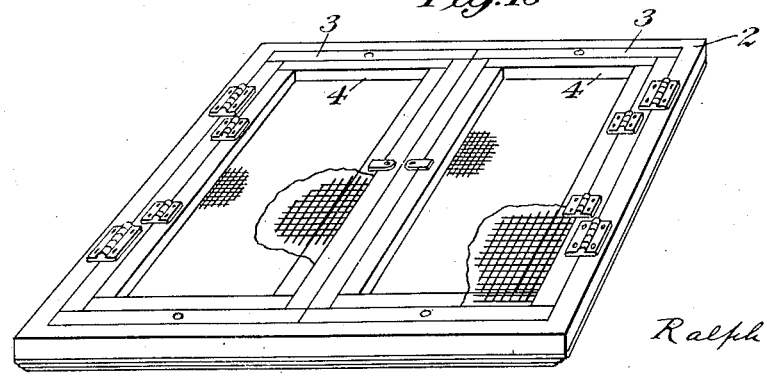
Inventor:
Ralph D. Crawford,
by his Attorney Patented July 9, 1935

2,007,296

UNITED STATES PATENT OFFICE 2,007,296

BAIT FISH RECEPTACLE

Ralph D. Crawford, Mamaroneck, N. Y.

Application December 8, 1933, Serial No. 701,437

13 Claims. (Cl. 43—55)

My invention relates to a receptacle for holding small live fish and the like, such as are used by anglers for bait in catching larger fish.

Objects of my invention are to produce a receptacle for the purpose described which can be readily assembled to form a closed, netted receptacle, or optionally folded up compactly for convenient transportation or storage; to provide a receptacle with a plurality of compartments; to provide ready access to the several compartments; to so construct the receptacle that it will effectually protect the small fish from depredations from larger fish from without; to so construct the receptacle that danger of injury to the small fish within it, by abrasions and the like, may be minimized; to equip the receptacle with a trap; to make the elements forming the trap readily foldable or collapsible; to provide the receptacle with storage pockets or spaces; and to accomplish the other desirable ends hereinafter pointed out.

Figure 1:
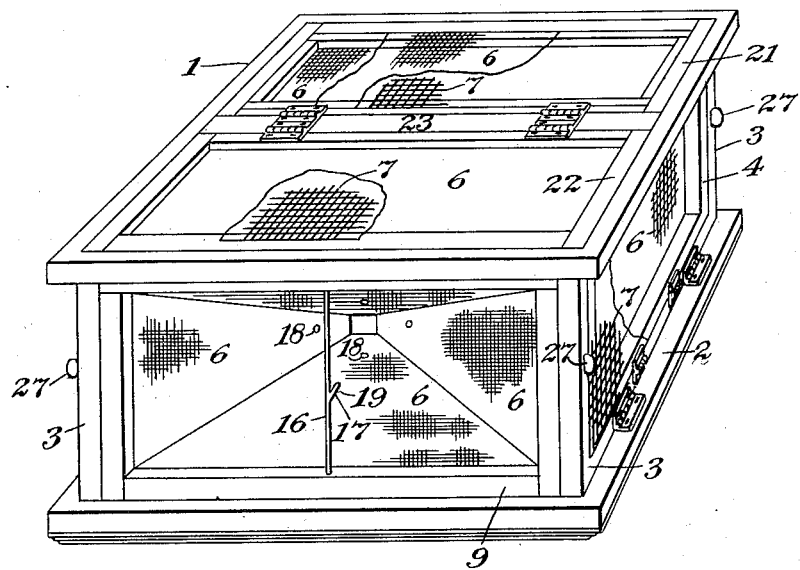
Figure 2:
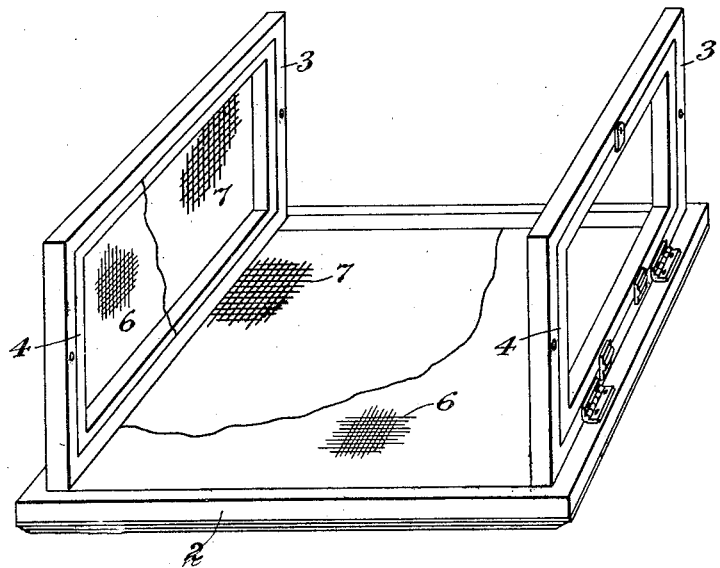

In the drawings, in all of which similar parts are indicated by corresponding reference numerals, Fig. 1 is a perspective view of a receptacle embodying my improvements; Fig. 2 is a perspective view of the assembled bottom and side portions of the receptacle; Fig. 3 is a perspective view of the top, end and partition elements, assembled, of the receptacle; Fig. 4 is a perspective view of the same elements as shown in Fig. 3, but turned upside down with the partition folded, and with the trap end swung outward for the purpose of clearer illustration; Fig. 5 is a longitudinal sectional view of the assembled receptacle, taken as on the line 5—5 of Fig. 6, looking to the right; Fig. 6 is a cross sectional view of the receptacle taken as on the line 6—6 of Fig. 5, looking to the left; Fig. 7 is a view of the trap elements folded, taken from within the trap; Fig. 8 is a vertical sectional view of the same taken as on the line 8—8 of Fig. 7, looking to the right; Fig. 9 is a perspective view of the elements shown in Fig. 3, folded, and turned upside down; Fig. 10 is a perspective view of the elements shown in Fig. 2 folded together; and Fig. 11 is a cross sectional view, on an enlarged scale, of one of the flaps of the trap, taken as on line 11—11 of Fig. 5, looking to the left; Figs. 5, 6, 7 and 8 are on an enlarged scale as compared with Figs. 1 to 4, 9 and 10; and Fig. 12 shows a modification, being a longitudinal view of the upper section of the receptacle folded, medial portions being broken away to shorten the figure. In several of the figures portions of the nettings have been broken away, or nettings entirely omitted, for better illustrating the construction.

The assembly of the receptacle is based on a rectangular top frame 1 and bottom frame 2. To opposite sides of the bottom frame 2 are hinged side frames 3, 3, adapted to fold inside of the frame or to be swung up at right angles to it as shown in Fig. 2. Within and hinged to each of the frames 3, 3, is a secondary frame 4 adapted to fold within the frame 3 or optionally to be swung outward from it.

The bottom of the frame 2 is covered first, preferably, with a wire screening 6 of a fine mesh, for instance, 24 gauge or finer, and outside of this is secured a stronger and much coarser screening 7, of a substantially heavier wire than the fine screening. These same types of netting are used on other parts of the receptacle; so I will hereafter refer to them as simply fine netting and coarse netting.

The frames 3, 3, are covered on their inner sides with fine netting; and the frames 4, 4 are covered on their outer sides with coarse netting.

To the ends of the frame 1 are hinged end frames 8, 9, adapted to be folded down parallel to or partially or wholly inside of the frame 1, or to be erected at right angles thereto, the frame 8 being covered with fine and coarse netting which may be both placed on the outside of the frame, or one upon the outside and one upon the inside as shown in Fig. 5. In the end frame 9 is mounted a series of four swinging wire frames 10, 10, and 12, 12, the frames 10, 10 being hinged within the ends of the frame 9 so as to fold inwardly therewithin, and the frames 12, 12, being hinged within the top and bottom of the frame 9 so as to fold inwardly therein. I have shown these wire frames as substantially triangular in form and each provided with arms projecting from two of its corners into sockets in the frame 9, to form hinge connections. The wire frames are covered, preferably, with fine wire netting, as 6.

Near the outer end of each frame 12, two arms or flanges 14, 14, lie in approximately the same plane as the frames 12 and extend outwardly therefrom.

By swinging the wire frames inwardly they may be assembled as shown in Figs. 5 and 6, the flanges 14, 14 passing through holes in the fine screening on the frames 10, 10, so as to project outside of the same; and the parts may be secured in assembled relation by passing pins 15, 15 through holes in the flanges, as shown in Figs. 4, 5 and 6. This arrangement produces a funnel-like trap, having an opening at its apex sufficiently large to permit the passage of small fish, such as live bait fish, through it.

Across the frame 9 is placed a rod or bar 16 having an arm 17 projecting inwardly therefrom, and adapted, when the wire-framed flaps are folded outwardly, to pass through holes 18, 18 in the netting of the flaps, which can be secured in folded relation as shown in Figs. 7 and 8 by passing a pin 19 through the end of the arm 17. It will be seen that this arrangement allows these screened wire frames to be erected into the form of a trap throat, or to be compactly folded down flat upon each other.

Two lid-frames 21, 22 are hinged within the frame 1, preferably to a cross-bar 23, so that they can be lifted to give ready access to the interior of the receptacle; both these frames are provided with fine and with coarse netting.

A partition frame 24 is hinged to the cross-bar 23, so as to swing downwardly therefrom, or to swing upwardly and nest inside of the frame 21. This frame 24 is provided with fine netting. It also has on each lower corner a slotted plate 25 slidably secured to it as by pins 26, 26 passing through the slot, so as to permit the plate to be slid to and fro on the partition frame 24.

The elements of the receptacle, which are attached to the frame 1, may be folded down within or parallel to that frame, as shown in Fig. 9; and the elements associated with the bottom frame 2 may be folded down within it, as shown in Fig. 10, thus reducing the knocked-down receptacle to a very compact and convenient form for storage or transportation.

To assemble the top and bottom sections, the sides of the bottom are raised, as shown in Fig. 2; the ends 8 and 9 and the partition 24 are lowered, as shown in Fig. 3, and the throat of the trap is erected as shown in Figs. 1, 3, 4, 5 and 6. The top section is then placed over the bottom section, the sides of the bottom section projecting up inside of the frame 1 and the bottoms of the frames 8, 9 extending down inside of the ends of the frame 2. Suitable fastenings, as pins 27, 27 are then inserted through holes in the side frames 3, 3 and end frames 8, 9, thus preventing their sliding apart or separating from each other, and effectually holding the assemblage in place. The plates 25, 25 are then slid outward under the bottoms of the side frames 3, 3 so as to close the space between the bottoms of the frames and the bottom netting, and also to anchor the partition 24 in position.

The construction described will give a receptacle which is netted upon all its exposed sides with a strong comparatively heavy exterior netting and with a finer inner netting by contact with which the inclosed small fish will not be seriously injured under ordinary circumstances, while the heavy exterior netting will prevent larger fish, rough handling, floating objects and the like, from breaking the fine netting and injuring or liberating the small fish in the receptacle. When the trap is submerged the inclosed fish are visible from without through the netting, and attract the attention of other fish, which, swimming around the receptacle, find the funnel-like entrance at one end, and pass through it into the receptacle, where they find themselves trapped. The receptacle, therefore, serves the purpose not only of a live fish bait box, but also a trap so that the fisherman's reserve of bait may be increased without special effort on his part.

In connection with the handling of live bait certain accessories, such as a dipper, a small collapsible bucket and the like, are desirable and convenient. The spaces between the nettings on the side frames 3, 3 and their doors 4, 4 constitute available places for more or less temporary storage, as during transportation, of such accessories as I have mentioned, and will be found by the fisherman to be most convenient for such purposes.

The doors 4, 4 also afford ready access to the space between the nettings, for cleaning &c. Storage space may also be found in the knocked-down receptacle, between the folded-up partition 24 and the lid 21.

I wish it to be understood that the construction I have described is to be considered as a typical and not as an exclusive embodiment of my invention. In Fig. 12 I have illustrated a slight modification wherein the end frames 8 and 9 and the lids 21 and 22 are made sufficiently thin to fold evenly within the frame 1, thus increasing the compactness of the folded section. And other details may be varied, as by the use of mechanical equivalents, without departing from the spirit of my invention and the scope of the claims.

Having thus described my invention what I claim and desire to secure by Letters Patent of the United States is:—

1. In a knock-down, bait-fish receptacle, the combination of a top frame provided with end frames hinged thereto and foldable therewithin, a bottom frame provided with side frames hinged thereto and foldable therewithin, and readily detachable means for securing the end frames to the side frames, all the frames being provided with an inner, fine wire netting, and all but one with a comparatively coarse and strong wire netting.

2. In a knock-down, bait-fish receptacle, the combination of a top frame provided with end frames hinged thereto and foldable therewithin, a bottom frame provided with side frames hinged thereto and foldable therewithin, each side frame being provided with a supplemental frame hinged therewithin, and readily detachable means for securing the end frames to the side frames, the frames being provided with wire netting thereupon.

3. In a knock-down, bait-fish receptacle, the combination of a rectangular, open top frame provided with rectangular, open end frames hinged thereto and foldable upward therewithin so that the lower surfaces of said frames may be flush with each other, a bottom frame provided with side frames hinged thereto and foldable downward therewithin so that the upper surfaces of said frames may be flush with each other, and readily detachable means for securing the end frames directly to the side frames, the frames being provided with netting thereupon.

4. In a knock-down, bait-fish receptacle, the combination of a rectangular, open top frame provided with rectangular, open end frames hinged thereto and foldable upward therewithin so that the lower surfaces of said frames may be flush with each other, a bottom frame provided with side frames hinged thereto and foldable downward therewithin so that the upper surfaces of said frames may be flush with each other, the end frames being adapted to seat within the ends of the bottom frame, and the side frames being adapted to seat within the sides of the top frame, and readily detachable means for securing the end frames directly to the side frames, the frames being provided with netting thereupon.

5. In a knock-down, bait-fish receptacle, the combination of a rectangular, open top frame provided with rectangular, open end frames hinged to the inner edges thereof and foldable upward therewithin so that the lower surfaces of said frames may be flush with each other, a bottom frame provided with side frames hinged to the inner edges thereof and foldable downward therewithin so that the upper surfaces of said frames may be flush with each other, the end frames being adapted to seat within the ends of the bottom frame, and the side frames being adapted to seat within the sides of the top frame, and readily detachable means for securing the end frames directly to the side frames, the frames being provided with netting thereupon.

6. In a knock-down, bait-fish receptacle, the combination of a top frame provided with end frames hinged thereto and foldable therewithin, a bottom frame provided with side frames hinged thereto and foldable therewithin, and readily detachable means for securing the end frames to the side frames, all the frames being provided with wire netting thereupon, and the entire receptacle being collapsible into two units, one no thicker than the top frame and the other no thicker than the bottom frame.

7. In a knock-down, bait-fish receptacle, the combination of a rectangular, open top frame provided with rectangular, open end frames hinged thereto and foldable upward therewithin so that the lower surfaces of said frames may be flush with each other, a lid frame hinged within the top frame and foldable downwardly therewithin so that its top surface may be flush with that of the top frame, a bottom frame provided with side frames hinged thereto and foldable downward therewithin so that the upper surfaces of said frames may be flush with each other, and readily detachable means for securing the end frames directly to the side frames, the frames being provided with netting thereupon.

8. In a knock-down, bait-fish receptacle, the combination of a rectangular, open top frame provided with rectangular, open end frames hinged thereto and foldable upward therewithin so that the lower surfaces of said frames may be flush with each other, a lid frame hinged within the top frame and foldable downwardly therewithin so that its top surface may be flush with that of the top frame, a partition frame swingably connected to the top frame and foldable upwardly therewithin so that its thickness may be entirely within that of the top frame, a bottom frame provided with side frames hinged thereto and foldable downward therewithin so that the upper surfaces of said frames may be flush with each other, and readily detachable means for securing the end frames directly to the side frames, the frames being provided with netting thereupon.

9. In a knock-down, bait-fish receptacle, the combination of a rectangular, open top frame provided with rectangular, open end frames hinged thereto and foldable upward therewithin so that the lower surfaces of said frames may be flush with each other, a lid frame hinged within the top frame and foldable downwardly therewithin so that its top surface may be flush with that of the top frame, a partition frame hinged to the lid frame and foldable upwardly therewithin so that its thickness may lie entirely within that of the lid frame, a bottom frame provided with side frames hinged thereto and foldable downward therewithin so that the upper surfaces of said frames may be flush with each other, and readily detachable means for securing the end frames directly to the side frames, the frames being provided with netting thereupon.

10. In a knock-down, bait-fish receptacle, the combination of a rectangular, open top frame provided with rectangular, open end frames hinged thereto and foldable upwardly therewithin so that the lower surfaces of the frame may be flush, a partition frame swingingly connected to the top frame, a rectangular, open bottom frame provided with rectangular, open side frames hinged thereto and foldable downwardly therewithin so that the upper surfaces of such frames may be flush, and readily releasable means for securing the end frames and partition frames to the side frames, the frames being provided with wire netting thereupon.

11. In a knock-down, bait-fish receptacle, the combination of a rectangular, open top frame provided with rectangular, open end frames hinged thereto and foldable upwardly therewithin so that the lower surfaces of the frames may be flush, a partition frame swingingly connected to the top frame and foldable therewithin so that the lower surfaces of said frames may be flush, a rectangular, open bottom frame provided with rectangular, open side frames hinged thereto and foldable downwardly therewithin so that the upper surfaces of such frames may be flush, and readily releasable means for securing the end frames and partition frame to the side frames, the frames being provided with wire netting thereupon.

12. In a knock-down, bait-fish receptacle, the combination of a rectangular, open top frame provided with rectangular, open end frames hinged thereto and foldable upward therewithin so that the lower surfaces of said frames may be flush with each other, a bottom frame provided with side frames hinged thereto and foldable downward therewithin so that the upper surfaces of said frames may be flush with each other, and readily detachable means for securing the end frames directly to the side frames, the frames being provided with netting thereupon, one of the end frames being provided with a plurality of substantially triangular netted frames adapted to be erected in the form of a trap throat or to be folded entirely within the planes of the inner and outer surfaces of the end frame.

13. In a knock-down, bait-fish receptacle, the combination of a rectangular, open top-frame provided with rectangular, open end-frames hinged thereto and foldable upward therewithin so that the lower surfaces of said frames may be flush with each other, a bottom frame provided with side frames hinged thereto and foldable downward therewithin so that the upper surfaces of said frames may be flush with each other, a supplemental frame hinged to the inner edge of one of the side frames and foldable inwardly therewithin so that the outer surfaces of said frames may be flush with each other, and readily detachable means for securing the end frames directly to the side frames, the frames being provided with netting thereupon.

RALPH D. CRAWFORD.